(12) United States Patent
Kerr et al.

(10) Patent No.: US 9,507,494 B1
(45) Date of Patent: Nov. 29, 2016

(54) MERCHANT CONTROLLED PLATFORM SYSTEM AND METHOD

(75) Inventors: Michael Kerr, Reno, NV (US); David Stewart, Stateline, NV (US)

(73) Assignee: NEXRF, CORP., Reno, NV (US)

( * ) Notice: Subject to any disclaimer, the term of this patent is extended or adjusted under 35 U.S.C. 154(b) by 294 days.

(21) Appl. No.: 13/153,214

(22) Filed: Jun. 3, 2011

Related U.S. Application Data (63) Continuation-in-part of application No. 12/821,852, filed on Jun. 23, 2010, now Pat. No. 8,738,024, which is a continuation-in-part of application No. 12/413,547, filed on Mar. 28, 2009, now Pat. No.

(Continued)

(51) Int. Cl.
*G06F 3/0482* (2013.01)

(52) U.S. Cl.
CPC .................................. *G06F 3/0482* (2013.01)

(58) Field of Classification Search
USPC ........................................ 463/20, 40, 42, 43
See application file for complete search history.

(56) References Cited

U.S. PATENT DOCUMENTS

| | | | |
|---|---|---|---|
| 4,339,798 A | 7/1982 | Hedges et al. |
| 4,856,787 A | 8/1989 | Itkis |
| 5,586,937 A | 12/1996 | Menashe |
| 5,594,491 A | 1/1997 | Hodge et al. |
| 5,630,757 A | 5/1997 | Gagin et al. |
| 5,643,086 A | 7/1997 | Alcorn et al. |
| 5,738,583 A | 4/1998 | Comas et al. |
| 5,761,416 A | 6/1998 | Mandal et al. |
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |

(Continued)

FOREIGN PATENT DOCUMENTS

| | | |
|---|---|---|
| FI | WO2008065257 A1 | 6/2008 |
| JP | 2009025019 A | 2/2009 |
| WO | 2008065257 A1 | 6/2008 |

OTHER PUBLICATIONS

Wirelss Network. Wikipedia. http://en.wikipedia.org/wiki/Wireless_network. Nov. 17, 2008.

(Continued)

*Primary Examiner* — Paul A D'Agostino
*Assistant Examiner* — Brandon Gray
(74) *Attorney, Agent, or Firm* — Kerr IP Group, LLC; Michael A. Kerr (57) ABSTRACT

A content management system for associating content with user attributes and delivering targeted content to a wireless handset is described. The content management system comprises a database, a wireless handset, and a terminal. The database is configured to store a plurality of user profiles, a plurality of content items, and a plurality of content connections that connect content items to user profile data. The wireless handset presents a first interface that enables the wireless handset user to create and edit a user profile comprising one or more user attributes. The user profile is stored in the database. The terminal presents a second interface to a content administrator. The second interface enables the content administrator to create and edit content items. The content items are stored in the database. Content connections associate one or more user attributes with a content item.

22 Claims, 9 Drawing Sheets

Related U.S. Application Data 8,942,995, application No. 13/153,214, which is a continuation-in-part of application No. 11/948,007, filed on Nov. 30, 2007, now Pat. No. 9,373,116.

(60) Provisional application No. 61/351,677, filed on Jun. 4, 2010, provisional application No. 61/351,770, filed on Jun. 4, 2010, provisional application No. 61/352,242, filed on Jun. 7, 2010, provisional application No. 61/223,565, filed on Jul. 7, 2009, provisional application No. 61/040,661, filed on Mar. 29, 2008, provisional application No. 60/872,351, filed on Nov. 30, 2006.

(56) References Cited

U.S. PATENT DOCUMENTS

| | | | |
|---|---|---|---|
| 5,800,268 | A | 9/1998 | Molnick |
| 5,851,149 | A | 12/1998 | Xidos et al. |
| 5,871,398 | A | 2/1999 | Schneier et al. |
| 5,902,983 | A | 5/1999 | Crevelt et al. |
| 5,947,821 | A | 9/1999 | Stone |
| 5,971,849 | A | 10/1999 | Falciglia |
| 6,001,016 | A | 12/1999 | Walker et al. |
| 6,010,404 | A | 1/2000 | Walker et al. |
| 6,106,396 | A | 8/2000 | Alcorn et al. |
| 6,142,876 | A | 11/2000 | Cumbers |
| 6,159,095 | A | 12/2000 | Frohm et al. |
| 6,178,510 | B1 | 1/2001 | O'Connor et al. |
| 6,203,428 | B1 | 3/2001 | Giobbi et al. |
| 6,259,405 | B1 | 7/2001 | Stewart et al. |
| 6,322,446 | B1 | 11/2001 | Yacenda |
| 6,327,535 | B1 | 12/2001 | Evans et al. |
| 6,409,602 | B1 | 6/2002 | Wiltshire et al. |
| 6,500,068 | B2 | 12/2002 | Walker et al. |
| 6,508,709 | B1 | 1/2003 | Karmarkar |
| 6,508,710 | B1 | 1/2003 | Paravia et al. |
| 6,527,638 | B1 | 3/2003 | Walker et al. |
| 6,554,705 | B1 | 4/2003 | Cumbers |
| 6,575,834 | B1 | 6/2003 | Lindo |
| 6,606,494 | B1 | 8/2003 | Arpee et al. |
| 6,612,928 | B1 | 9/2003 | Bradford et al. |
| 6,628,939 | B2 | 9/2003 | Paulsen |
| 6,638,170 | B1 | 10/2003 | Crumby |
| 6,640,218 | B1 | 10/2003 | Golding et al. |
| 6,676,522 | B2 * | 1/2004 | Rowe et al. .................. 463/42 |
| 6,682,421 | B1 | 1/2004 | Rowe et al. |
| 6,702,672 | B1 | 3/2004 | Angell et al. |
| 6,709,333 | B1 | 3/2004 | Bradford et al. |
| 6,709,631 | B2 | 3/2004 | Mori et al. |
| 6,719,631 | B1 | 4/2004 | Tulley et al. |
| 6,749,512 | B2 | 6/2004 | MacGregor et al. |
| 6,782,253 | B1 | 8/2004 | Shteyn et al. |
| 6,834,195 | B2 | 12/2004 | Brandenberg et al. |
| 6,875,110 | B1 | 4/2005 | Crumby |
| 6,879,838 | B2 | 4/2005 | Rankin et al. |
| 6,884,162 | B2 | 4/2005 | Raverdy et al. |
| 6,942,574 | B1 | 9/2005 | LeMay et al. |
| 7,035,651 | B2 | 4/2006 | Schreiner et al. |
| 7,076,243 | B2 | 7/2006 | Parupudi et al. |
| 7,107,245 | B1 | 9/2006 | Kowalick |
| 7,136,915 | B2 | 11/2006 | Rieger, III |
| 7,196,662 | B2 | 3/2007 | Misikangas et al. |
| 7,209,752 | B2 | 4/2007 | Myllymaki et al. |
| 7,213,048 | B1 | 5/2007 | Parupudi et al. |
| 7,218,941 | B1 | 5/2007 | Kubo et al. |
| 7,228,136 | B2 | 6/2007 | Myllymaki et al. |
| 7,299,059 | B2 | 11/2007 | Misikangas et al. |
| 7,338,372 | B2 | 3/2008 | Morrow et al. |
| 7,341,522 | B2 | 3/2008 | Yamagishi |
| 7,349,683 | B2 | 3/2008 | Misikangas |
| 7,359,714 | B2 | 4/2008 | Parupudi et al. |
| 7,397,424 | B2 | 7/2008 | Houri |
| 7,450,954 | B2 | 11/2008 | Randall |
| 7,493,565 | B2 | 2/2009 | Parupudi et al. |
| 7,529,639 | B2 | 5/2009 | Rasanen et al. |
| 7,534,169 | B2 | 5/2009 | Amaitis et al. |
| 7,611,407 | B1 | 11/2009 | Itkis et al. |
| 7,753,772 | B1 | 7/2010 | Walker et al. |
| 8,002,617 | B1 | 8/2011 | Uskela et al. |
| 8,029,349 | B2 | 10/2011 | Lind |
| 8,172,684 | B2 | 5/2012 | Adiraju et al. |
| 8,403,755 | B2 | 3/2013 | Kerr |
| 8,492,995 | B2 | 7/2013 | Maxik et al. |
| 8,506,406 | B2 | 8/2013 | Kerr |
| 8,506,407 | B2 | 8/2013 | Kerr |
| 8,523,679 | B2 | 9/2013 | Kerr |
| 8,738,024 | B1 | 5/2014 | Kerr et al. |
| 8,747,229 | B2 | 6/2014 | Kerr |
| 8,942,995 | B1 | 1/2015 | Kerr |
| 9,043,222 | B1 | 5/2015 | Kerr et al. |
| 2001/0004768 | A1 | 6/2001 | Hodge et al. |
| 2001/0005908 | A1 | 6/2001 | Hodge et al. |
| 2001/0036224 | A1 | 11/2001 | Demello et al. |
| 2001/0039210 | A1 | 11/2001 | St-Denis |
| 2001/0044337 | A1 | 11/2001 | Rowe et al. |
| 2002/0002073 | A1 | 1/2002 | Montgomery et al. |
| 2002/0007494 | A1 | 1/2002 | Hodge |
| 2002/0056125 | A1 | 5/2002 | Hodge et al. |
| 2002/0056143 | A1 | 5/2002 | Hodge et al. |
| 2002/0069105 | A1 | 6/2002 | Botelho et al. |
| 2002/0077130 | A1 | 6/2002 | Owensby |
| 2002/0077167 | A1 | 6/2002 | Merari |
| 2002/0091568 | A1 | 7/2002 | Kraft et al. |
| 2002/0103028 | A1 | 8/2002 | Carter et al. |
| 2002/0111210 | A1 | 8/2002 | Luciano et al. |
| 2002/0111907 | A1 | 8/2002 | Ling |
| 2002/0133707 | A1 | 9/2002 | Newcombe |
| 2002/0142815 | A1 | 10/2002 | Candelore |
| 2002/0142844 | A1 | 10/2002 | Kerr |
| 2002/0142846 | A1 | 10/2002 | Paulsen |
| 2002/0144151 | A1 | 10/2002 | Shell et al. |
| 2002/0174436 | A1 | 11/2002 | Wu et al. |
| 2002/0198775 | A1 | 12/2002 | Ryan |
| 2003/0009385 | A1 | 1/2003 | Tucciarone et al. |
| 2003/0030666 | A1 | 2/2003 | Najmi et al. |
| 2003/0032409 | A1 | 2/2003 | Hutcheson et al. |
| 2003/0064805 | A1 * | 4/2003 | Wells ............................. 463/39 |
| 2003/0144017 | A1 | 7/2003 | Inselberg |
| 2004/0023721 | A1 * | 2/2004 | Giobbi ........................... 463/39 |
| 2004/0192438 | A1 | 9/2004 | Wells et al. |
| 2004/0224757 | A1 | 11/2004 | Yamamura et al. |
| 2005/0046608 | A1 | 3/2005 | Schantz et al. |
| 2005/0048990 | A1 | 3/2005 | Lauriol |
| 2005/0085257 | A1 | 4/2005 | Laird et al. |
| 2005/0114212 | A1 | 5/2005 | Carrez et al. |
| 2005/0136949 | A1 | 6/2005 | Barnes |
| 2005/0154646 | A1 | 7/2005 | Chermesino |
| 2005/0159883 | A1 | 7/2005 | Humphries et al. |
| 2005/0181804 | A1 | 8/2005 | Misikangas et al. |
| 2005/0246334 | A1 | 11/2005 | Tao et al. |
| 2005/0261063 | A1 | 11/2005 | Boyd et al. |
| 2006/0003830 | A1 | 1/2006 | Walker et al. |
| 2006/0004627 | A1 | 1/2006 | Baluja |
| 2006/0058102 | A1 | 3/2006 | Nguyen et al. |
| 2006/0063575 | A1 | 3/2006 | Gatto et al. |
| 2006/0125693 | A1 | 6/2006 | Recker |
| 2006/0181411 | A1 | 8/2006 | Fast et al. |
| 2006/0189382 | A1 | 8/2006 | Muir et al. |
| 2006/0194633 | A1 * | 8/2006 | Paulsen ........................ 463/43 |
| 2006/0238382 | A1 | 10/2006 | Kimchi et al. |
| 2006/0240891 | A1 | 10/2006 | Klinkhammer et al. |
| 2006/0287810 | A1 | 12/2006 | Sadri et al. |
| 2007/0008108 | A1 | 1/2007 | Schurig et al. |
| 2007/0024580 | A1 | 2/2007 | Sands et al. |
| 2007/0025265 | A1 | 2/2007 | Porras et al. |
| 2007/0060306 | A1 | 3/2007 | Amaitis et al. |
| 2007/0061229 | A1 | 3/2007 | Ramer et al. |
| 2007/0087834 | A1 | 4/2007 | Moser et al. |
| 2007/0100963 | A1 | 5/2007 | Ban et al. |
| 2007/0136132 | A1 | 6/2007 | Weiser et al. |
| 2007/0149215 | A1 | 6/2007 | Misikangas |
| 2007/0149216 | A1 | 6/2007 | Misikangas |
| 2007/0167210 | A1 | 7/2007 | Kelly et al. |

(56) References Cited

U.S. PATENT DOCUMENTS

| | | |
|---|---|---|
| 2007/0168127 A1 | 7/2007 | Zaruba et al. |
| 2007/0184852 A1 | 8/2007 | Johnson et al. |
| 2007/0218975 A1 | 9/2007 | Iddings et al. |
| 2007/0243925 A1 | 10/2007 | LeMay et al. |
| 2007/0244633 A1 | 10/2007 | Phillips et al. |
| 2007/0257831 A1 | 11/2007 | Mathews et al. |
| 2007/0270212 A1 | 11/2007 | Cockerille et al. |
| 2007/0281692 A1 | 12/2007 | Bucher et al. |
| 2008/0026844 A1 | 1/2008 | Wells |
| 2008/0032705 A1 | 2/2008 | Patel et al. |
| 2008/0039192 A1 | 2/2008 | Laut |
| 2008/0057894 A1 | 3/2008 | Aleksic et al. |
| 2008/0076572 A1 | 3/2008 | Nguyen et al. |
| 2008/0085692 A1 | 4/2008 | Hart et al. |
| 2008/0096659 A1 | 4/2008 | Kreloff et al. |
| 2008/0097858 A1 | 4/2008 | Vucina et al. |
| 2008/0102947 A1 | 5/2008 | Hays et al. |
| 2008/0108430 A1 | 5/2008 | Evans |
| 2008/0113785 A1 | 5/2008 | Alderucci et al. |
| 2008/0153515 A1 | 6/2008 | Mock et al. |
| 2008/0162037 A1 | 7/2008 | Hasan |
| 2008/0166973 A1 | 7/2008 | Hart et al. |
| 2008/0167106 A1 | 7/2008 | Lutnick et al. |
| 2008/0186234 A1 | 8/2008 | Alles et al. |
| 2008/0189360 A1 | 8/2008 | Kiley et al. |
| 2008/0207296 A1 | 8/2008 | Lutnick et al. |
| 2008/0227473 A1 | 9/2008 | Haney |
| 2008/0249833 A1 | 10/2008 | Ali et al. |
| 2008/0252527 A1 | 10/2008 | Garcia |
| 2008/0281668 A1 | 11/2008 | Nurminen |
| 2009/0018929 A1 | 1/2009 | Weathers |
| 2009/0150217 A1 | 6/2009 | Luff |
| 2009/0197684 A1 | 8/2009 | Arezina et al. |
| 2009/0213771 A1 | 8/2009 | Celentano et al. |
| 2009/0214036 A1 | 8/2009 | Shen et al. |
| 2009/0298513 A1 | 12/2009 | Hampel et al. |
| 2010/0022308 A1 | 1/2010 | Hartmann et al. |
| 2010/0027521 A1 | 2/2010 | Huber et al. |
| 2010/0039929 A1 | 2/2010 | Cho et al. |
| 2010/0048242 A1 | 2/2010 | Rhoads et al. |
| 2010/0063854 A1 | 3/2010 | Purvis et al. |
| 2010/0121567 A1 | 5/2010 | Mendelson |
| 2010/0167771 A1 | 7/2010 | Raghothaman et al. |
| 2010/0179885 A1 | 7/2010 | Fiorentino |
| 2010/0280960 A1 | 11/2010 | Ziotopoulos et al. |
| 2010/0287033 A1 | 11/2010 | Mathur |
| 2010/0302056 A1 | 12/2010 | Dutton et al. |
| 2010/0305855 A1 | 12/2010 | Dutton et al. |
| 2010/0331016 A1 | 12/2010 | Dutton et al. |
| 2011/0078167 A1 | 3/2011 | Sundaresan et al. |
| 2011/0103360 A1 | 5/2011 | Ku et al. |
| 2012/0115512 A1 | 5/2012 | Grainger et al. |
| 2012/0122476 A1 | 5/2012 | Lee et al. |
| 2013/0003572 A1 | 1/2013 | Kim et al. |

OTHER PUBLICATIONS

"Tracking Cookie." Wikipedia. http://en.wikipedia.org/wiki/Tracking_cookie. May 24, 2009.

Blom et al. "Transmission Power Measurements for Wireless Sensor Nodes and their Relationship to Battery Level." Symposium on Wireless Communication Systems. pp. 342-345, Sep. 7, 2005.

"Wi-Fi Location-Based Services—Design and Deployment Considerations." 2006 Cisco Systems. Accessed Dec. 2008. https://learningnetwork.cisco.com/docs/DOC-3418.

"Location in SIP/IP Core Architecture." Open Mobile Alliance. Sep. 4, 2008. Accessed Dec. 2008. http://www.openmobilealliance.org/technical/release_program/locsip_archive.aspx.

Want et al. "The Active Badge Location System." ACM Transactions on Office Information Systems (TOIS) vol. 10. No. 1, pp. 91-102, Jan. 1992.

Youssef et al. "Location-Clustering Techniques for WLAN Location Determination Systems." 2006. http://wrc.ejust.edu.eg/papers/ijca.pdf.

Vegni et al. "Local Positioning Services on IEEE 802.11 Networks." Radio Engineering, pp. 42-47, vol. 17, No. 2, Jun. 2008.

Ladd et al. "On the Feasibility of Using Wireless Ethernet for Indoor Localization." IEEE Transactions on Robotics and Automation, pp. 555-559, vol. 20, Issue 3, No. 3, Jun. 2004.

Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless-lan-terminals-using-rssi-between-terminals/330959.

Lafargue, Edouard. "Wireless Network Audits using Open Source Tools". SANS Institute 2003. Accessed Dec. 2008. http://www.sans.org/reading_room/whitepapers/auditing/wireless-network-audits-open-source-tools_1235.

Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/massad.pdf.

Li et al. "A New Method for Yielding a Database of Location Fingerprints in WLAN" IEE Communications Proceedings, pp. 580-586, vol. 152, Issue 5, Oct. 7, 2005.

Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.

Muthukrishnan, et al. "Sensing motion using spectral and spatial analysis of WLAN RSSI." Proceedings of the 2nd European conference on Smart sensing and context. 2007. pp. 62-76.

Capkun et al. "Mobility Helps Peer-to-Peer Security." IEEE Transactions on Mobile Computing. vol. 5, Issue 1, pp. 43-51, Jan. 2006.

Milojicic et al. "Peer-to-Peer Computing" Jul. 10, 2002. https://www.hpl.hp.com/techreports/2002/HPL-2002-57R1.pdf.

"The New Normal of Retailing: The Rise of the Mobile Shopper." Next Generation Retail Summit. 2010. http://www.ngrsummit.com/media/whitepapers/Microsoft_NGRUS.pdf.

Lamarca et al. "Place Lab: Positioning Using Radio Beacons in the Wild." Pervasive 2005, LNCS 3468, pp. 116-133, 2005.

Borriello et al. "Delivering Real-World Ubiquitous Location Systems." Communications of the ACM. pp. 36-41, vol. 48, Issue 3, Mar. 2005.

Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.

Hightower et al. "Practical Lessons from the Place Lab." IEEE Pervasive Computing. pp. 32-39, vol. 5, Issue 3, Jul.-Sep. 2006.

Hile et al. "Indoor Location Estimation with Placelab." http://www.cs.washington.edu/education/courses/cse590gb/04wi/projects/hile-liu/. Jan. 8, 2004. Accessed on Sep. 25, 2008.

Kang "Extracting Places from Traces of Locations." ACM SIGMOBILE Mobile Computing and Communications Review. vol. 9, Issue 3, Jul. 2005.

Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201_6.

Otsason et al. "Accurate GSM Indoor Localization." Ubiquitous Computing 2005, LNCS 3660, pp. 141-158, 2005.

Varshavsky et al. "Are GSM Phones THE Solution for Localization?" 7th IEEE Workshop on Mobile Computing Systems and Applications, 2006. pp. 34-42, Aug. 1, 2005.

Chawathe et al. "A Case Study in Building Layered DHT Applications." Proceedings of the 2005 conference on Applications, technologies, architectures, and protocols for computer communications. vol. 35, Issue 4, Oct. 2005.

Lamarca et al. "Finding Yourself: Experimental location technology relies on Wi-Fi and cellphone signals instead of orbiting satellites." Dec. 2004. http://spectrum.ieee.org/computing/networks/finding-yourself.

Letchner et al. "Large-Scale Localization from Wireless Strength." In Proceeding of the National Conference on Artificial Intelligence (AAAI), 2005.

(56) References Cited

OTHER PUBLICATIONS

Welbourne et al. "Mobile Context Inference Using Low-Cost Sensors." Location and Context-Awareness Lecture Notes in Computer Science, 2005, vol. 3479/2005, pp. 95-127.
Balakrishnan et al. "Lessons from Developing and Deploying the Cricket Indoor Location System." Nov. 7, 2003. http://www.sds.lcs.mit.edu/projects/cricket/V1Exp.pdf.
Cheng et al. "Accuracy Characterization for Metropolitan-scale Wi-Fi Localization." Proceedings of the 3rd international conference on Mobile systems, applications, and services. 2005.
"Ekahau Positioning Engine 4.2." 2008. http://www.nowire.se/images/produktblad/ekahau/datasheet_epe_42_en_11022008_lo.pdf. Sep. 29, 2008.
"Internet Industry Interacting Gambling Code: A Code for Industry Co-Regulation in the Area of Internet Gambling Content Pursuant to the Requirements of the Interactive Gambling Act 2001." Internet Industry Association. Dec. 2001.
"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.
"Wireless Network." Wikipedia. http://en.wikipedia.org/wiki/Wireless.sub.--network. Nov. 17, 2008.
Chen et al. "Practical Metropolitan-Scale Positioning for GSM Phone." UbiComp 2006: Ubiquitous Computing Lecture Notes in Computer Science, 2006, vol. 4206/2006, pp. 225-242.
HTTP Cookie, redirected from tracking cookie as downloaded from wikipedia, 41 pages.
Interactive Gambling Industry Code, Dec. 2001, 7 pages.
Ladd et al. "Using Wireless Ethernet for Localization." IEEE/RJS International Conference on Intelligent Robots and Systems. 2002.
Lafargue, Edouard. "Wireless Network Audits using Open Source Tools". SANS Institute 2003. Accessed Dec. 2008. http://www.sans.org/reading.sub.--room/whitepapers/auditing/wireless-netw-ork-audits-open-source-tools.sub.--1235.
Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201.sub.—6.
Wireless Network as downloaded from wikipedia.com, pp. 5 pages.

\* cited by examiner

Figure 1

| User Profile ||
|---|---|
| User ID | 12345678 |
| Name | Joe Smith |
| Age | 35 |

Associate Content with User Group Attributes

Content Item: 21 Tournament ▼ — 552
- 21 Tournament
- Casino Floor
- Room Service
- Rewards/Points User Attribute Type: Game ▼ — 554
- Age
- Age Range
- Game
- Gender User Attribute Value: Blackjack ▼ — 556
- Blackjack
- Poker
- Roulette Level: 2 — 560

Parent Content Item: Casino Floor ▼ — 562
- Casino Floor
- Room Service
- Rewards/Points Relevance Weighting: 80 — 558

MERCHANT CONTROLLED PLATFORM SYSTEM AND METHOD

CROSS-REFERENCE

This patent application claims the benefit of provisional patent application 61/351,677 filed on Jun. 4, 2010;

this patent application also claims the benefit of provisional patent application 61/351,770 filed on Jun. 4, 2010;

this patent application also claims the benefit of provisional patent application 61/352,242 filed on Jun. 7, 2010;

this patent application is a continuation-in-part of patent application Ser. No. 12/821,852 filed on Jun. 23, 2010 now U.S. Pat. No. 8,738,024 that claims the benefit of provisional patent application 61/223,565 filed on Jul. 7, 2009;

this patent application is a continuation-in-part of patent application Ser. No. 12/413,547 filed on Mar. 28, 2009 now U.S. Pat. No. 8,942,995 that claims the benefit of provisional patent application 61/040,661 filed on Mar. 29, 2008;

this patent application is a continuation-in-part of patent application Ser. No. 11/948,007 filed on Nov. 30, 2007 now U.S. Pat. No. 9,373,116 that claims the benefit of provisional patent application 60/872,351 filed on Nov. 30, 2006; and the above patent applications hereby incorporated by reference in this patent application.

FIELD

The present invention relates to a system and method for delivery of targeted content to a wireless handset. More particularly, the present invention relates to populating a database on a server with user profiles and content, associating content with user attributes, filtering content and delivering content matching the user attributes of the wireless handset user.

BACKGROUND

The wireless handset presents new opportunities for merchants to communicate with customers. The merchant may wish to provide information to the customer regarding a product or service, offer incentives to the customer to enter a premises or make a purchase, or provide services that utilize the capabilities of the wireless handset.

When a merchant premises is large or the merchant offers a complex variety of products, the customer may require assistance to find a desired product or to attain the information needed about a product to make a purchase decision. An employee with sufficient training, knowledge and availability may be able to provide the needed assistance. If the employee is not available or able to assist, the customer may use a web browser on a wireless handset to find additional information about a desired product or service. However, the small display and interface format of a wireless handset may hinder the customer's effort to find information with a typical internet browser running on a wireless handset. Thus, there is a need for a custom interface specific to the merchant's offerings, allowing the merchant to provide information to the customer in an efficient and easily navigable fashion.

A merchant wishing to advertise to the customer may wish to leverage the functionality of the customer's wireless handset by providing targeted advertising to the user. Although a merchant may use a sign or an LCD display to provide advertising at a specific location on the merchant premises, these advertising mechanisms will typically be directed at the entire range of potential customer demographics, due to the inability of these mechanisms to distinguish among customers. There is a need for a platform that allows the merchant to provide advertising to a customer, taking into account the customer's location on or near the merchant premises and information about the customer that the customer has chosen to make available to the merchant.

Merchants having loyalty programs or other programs to increase interactions with the customer may rely on postal mail or e-mail to communicate with customers. However, the merchant lacks a means to incorporate the program into the customer experience on the merchant premises. Thus, there is a need for an application running on a wireless handset that allows a merchant to provide the benefits of the loyalty program to the customer while the customer is on or near the merchant premises.

While the customer may realize a number of benefits from the solutions described above, the customer will be discouraged if the merchant's use of the application fails to meet the customer's needs or exceeds the customer's desire for the information. There is a need for a feedback system which allows the customer to rank or decline the provided content to indicate which content is desired and/or helpful. Such a feedback system would ensure that the customer and other future customers would continue to receive the most desirable and useful information provided by the merchant.

Further, customers may only be willing to share the personal information that will allow the provided information to be targeted at the customer if the customer has control over what information is provided to the merchant. Thus, there is a need for an information privacy management system which the customer uses to control the information available to the merchant.

SUMMARY

A content management system is described. The content management system comprises a database, a wireless handset, and a terminal. The database is configured to store a plurality of user profiles, a plurality of content items and a plurality of content connections. The wireless handset presents a first interface to the wireless handset user. The first interface enables the wireless handset user to create and edit a user profile comprising one or more user attributes. The user profile is stored in the database. The terminal presents a second interface to a content administrator. The second interface enables the content administrator to create and edit content items. The content items are stored in the database. The content connections associate one or more user attributes with a content item. The content management system further comprises an application on the server. The application is configured to filter content items by user attribute and deliver at least one content item to the wireless handset associated with a user attribute connected to the content item.

In another embodiment, the content management system comprises a means for creating an association between one or more user attributes and a content item.

A method for delivering content to a wireless handset is also described. The method comprises transmitting a user profile from a wireless handset to a server and transmitting a plurality of content items from a terminal to a server. The method further comprises storing a plurality of content connections on a database located on the server. Some or all of the content connections associate one or more user attributes with one or more content items. The method further comprises filtering the content items by user attribute. The filtered content items are then delivered to the wireless handset.

FIGURES

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

A merchant controlled platform for delivery of targeted content to a user's wireless handset over a wireless network is described. The merchant controlled platform may also be referred to as a "merchant control plane" (MCP). The MCP is a content management system that enables a merchant to control distribution of content to wireless handset users within a variety of different geographic spaces. In the MCP, content is distributed as a function of one or more attributes stored in a user profile on a server. The content may be distributed by being "pushed" from the server to the wireless handset or "pulled" by the user controlling the wireless handset.

The MCP allows a merchant to associate content with information stored in a user profile. The server applies information stored in the user profile to make a determination of content to be targeted at the user. The server communicates with the wireless device to deliver the content.

Figure 1:
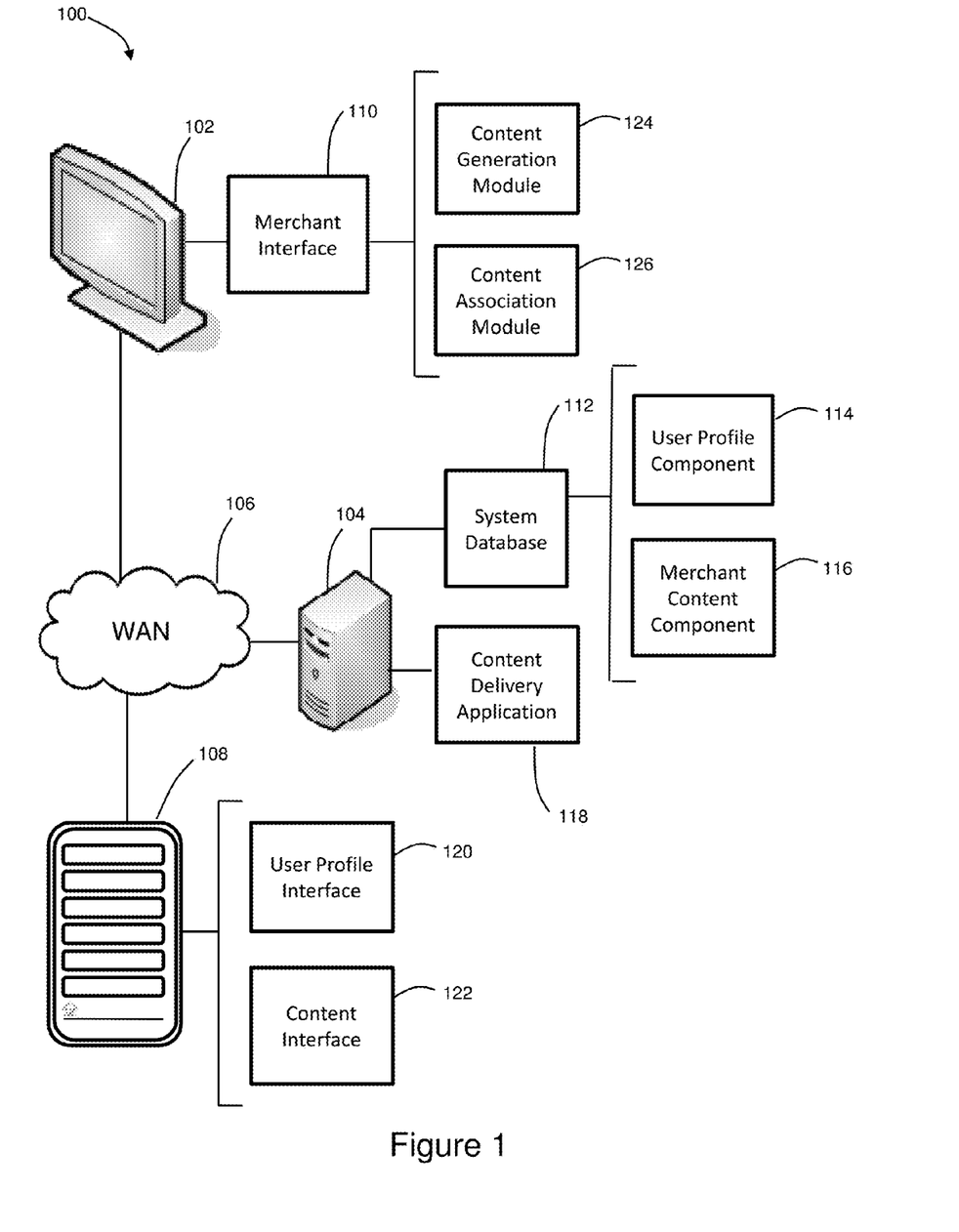
FIG. 1 shows an illustrative system architecture for a merchant content delivery system.

Referring to FIG. 1, an illustrative system architecture for a merchant content delivery system is shown. The system architecture comprises a merchant terminal 102, a server 104, a wireless network 106 and a wireless handset 108.

The merchant terminal 102 is a computing device capable of presenting a user interface to the content administrator for exchanging data with server 104. The merchant terminal may be, for example, a personal computer. In some embodiments, the merchant terminal is a wireless handset.

The wireless handset 108 may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network, WLAN, Wi-Fi or WiMAX. It shall be appreciated by those of ordinary skill in the art that the term wireless handset, mobile handset, wireless phone, and mobile phone are interchangeable.

The wireless handset is in communication with an antenna. The antenna may be one of a plurality of base station antennas associated with a cellular phone network, or an antenna associated with a wireless local area network access point, and may use Wi-Fi or WiMAX, or other such networking protocols.

The merchant terminal 102 and wireless handset 108 may be communicatively coupled to a server 104 via a wireless network 106 such as a wide area network. The wireless network could alternatively be a MAN, LAN or other network to facilitate the transmission of data between remote devices.

The software associated with merchant terminal 102 comprises a merchant interface application 110. The merchant interface application may be installed on the merchant terminal. Alternately, the merchant interface may run on a remote source and accessed by the merchant terminal via the wireless network 106. For example, the merchant interface application may be accessed via an internet browser.

The software associated with the wireless handset 108 comprises a user profile interface 120 and a content interface 122. The user profile interface and the content interface may be components of a single application or may be separate applications. The content interface and user profile interface may run on the handset or may run on a remote source and may be accessed by the wireless handset via the wireless network 106. The user of the wireless handset uses the user profile interface to provide information to user profile component 114 of system database 112. In some embodiments, the user may use a personal computer or other computing device to provide user information to the user profile component. The content interface 122 receives content from the server 104 and presents the content to the wireless handset user. The content interface 122 may be referred to as a Mobile Autonomous Dynamic Graphical User Interface (MADGUI). The MADGUI is described in more detail below. Additional applications, such as Loyalty Program applications and Food and Beverage Ordering applications, may be delivered from the server 104 to the wireless handset 108 individually or via the MADGUI.

A system database 112 runs on the server 104. The system database 112 comprises a user profile component 114 and a merchant content component 116. The user profile component 114 comprises user attributes provided by the user through the user profile interface 120. In some embodiments, the user profile component further comprises user attributes generated by the merchant. For example, the merchant may generate a user attribute indicating the transaction history for a user. The merchant content component 116 comprises information provided by the content administrator through the merchant interface 110.

A content delivery application 118 also runs on the server 104. The content delivery application filters content stored in the system database 112 and delivers the filtered content to content interface 122 on wireless handset 108. The filtering applied to the content is described in more detail below.

The merchant interface 110 may comprise one or more interface modules, such as a content generation module 124 and a content association module 126. The content generation module 124 allows a content administrator to upload content items to the merchant content component 116 of the system database 112. The content administrator is a person who uses the merchant interface 110 to provide content to server 104. The content association module 126 allows the content administrator to create content associations in the merchant content component 116 of system database 112. The content associations may include associations of content with user attributes stored in the user profile component 114 of system database 112. The associations between the merchant content and user attributes are stored in merchant content component 116. Merchant content stored at merchant content component 116 is filtered by content delivery application 118 and delivered to content interface 122 via wireless network 106.

Figure 2:
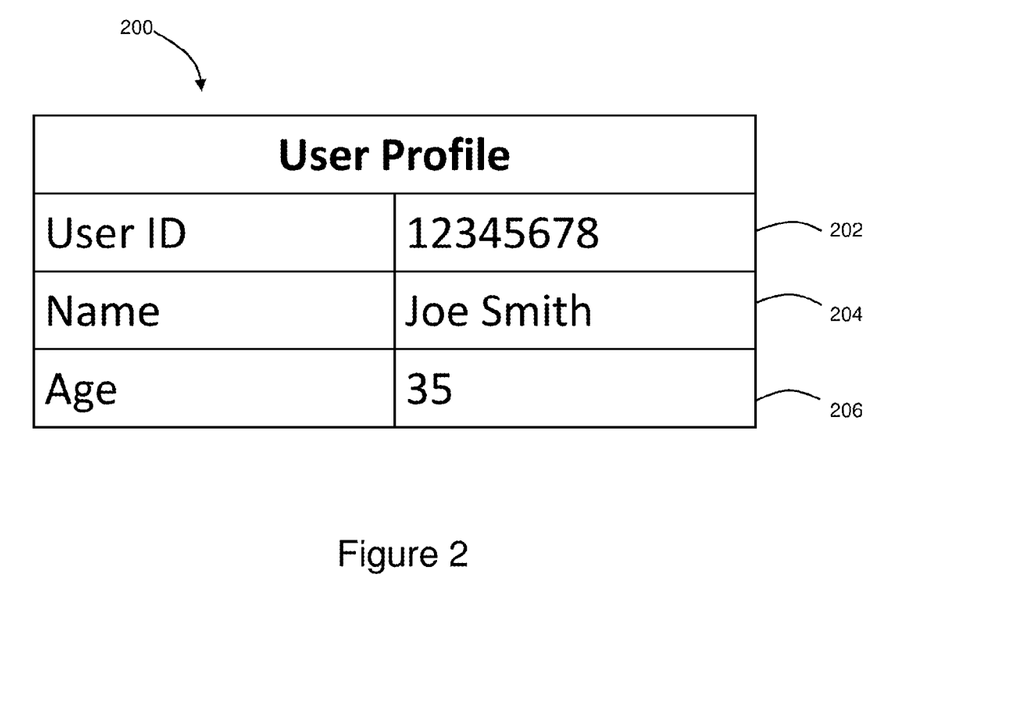
FIG. 2 shows an illustrative database table entry for a user profile.

Referring to FIG. 2, an illustrative database table entry 200 for a user profile is shown. The User Profile Table resides in the user profile component 114 of system database 112 on the server 104. The table may be populated with information provided via a user interface on the wireless handset 108. In some embodiments, the user enters user profile information using an interface on a home computer or using a terminal located in the merchant space. The User Profile Table may store information such as a user ID 202, name 204, and age 206. The table may also store additional information, such as a user address, phone number, and other contact and demographic information.

Figure 3A:
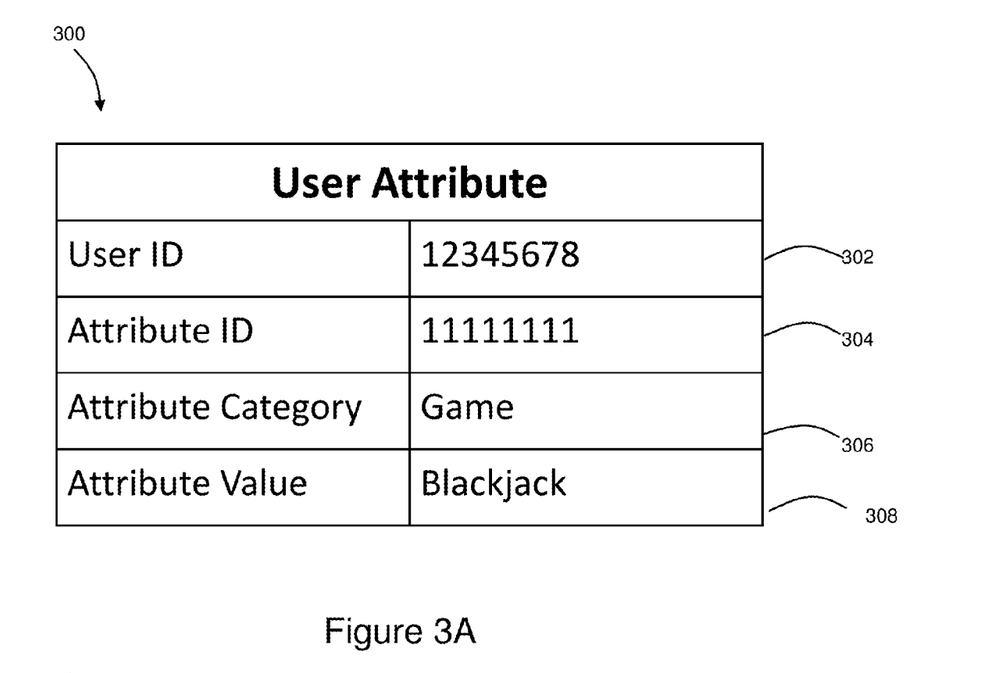
FIG. 3A shows an illustrative database table entry for a user attribute table.

Referring to FIG. 3A, an illustrative database table entry 300 for the User Attribute Table is shown. The user attribute table may be located on wireless handset 108 or on user profile component 114 of system database 112 on server 104. Locating the user attributes table on the wireless handset protects user privacy by maintaining information in a location where the user has control over the information. The user attribute table stores a user ID 302, an unique attribute identifier 304, an attribute category 306, and an attribute value 308. Attributes may be linked to a single user in a many-to-one relationship through use of a user attribute table. A user attribute may indicate demographic information such as the user's age or gender, the hobbies or interests of the user, or other information relevant to the user's potential interest in a particular product or service. In some embodiments, demographic information from a user profile table is propagated to the user attribute table. For example, when the user creates a user profile indicating the user's age, an entry in the user attribute table may be automatically generated to associate the user's User ID with the Attribute ID corresponding to the user's age.

In the User Attribute Table, attribute category "Game" may have several attribute values associated with it, such as "Blackjack," "Poker," "Slots," and "Keno." Entry 300 links the user ID 202 of FIG. 2 with the attribute value "Blackjack". The data stored in entry 300 indicates that User 12345678 has an interest in the game blackjack. This is information that may have been provided by the user through an interface on a wireless handset 108 or other device.

Figure 3B:
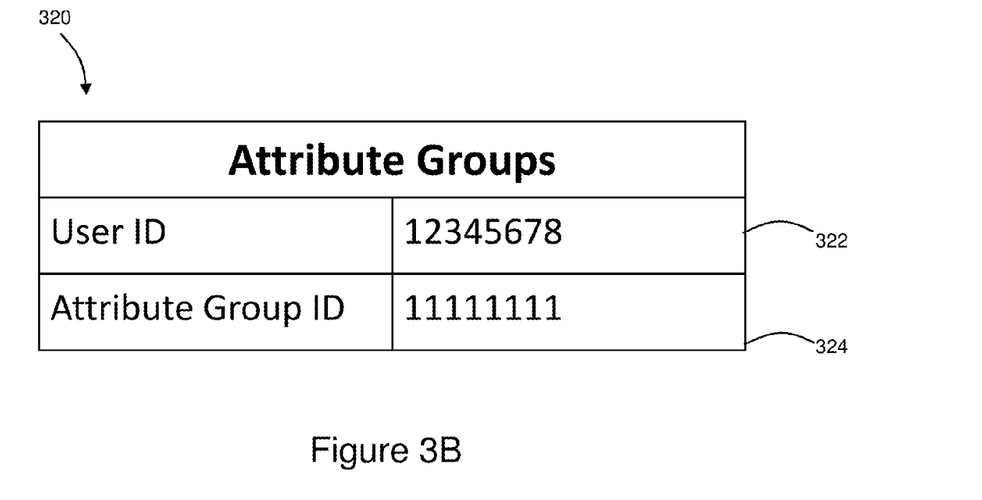
FIG. 3B shows an illustrative database entry for an attribute group table.

Referring now to FIG. 3B, an illustrative database table entry 320 for the Attribute Group Table is shown. Each entry in the Attribute Group Table associates a user ID 322 with an attribute group ID 324. The Attribute Group Table may be populated with values stored in the User Attribute Table on a periodic basis, such as an hourly, daily, or weekly basis. In some embodiments, the Attribute Group Table is updated every time the User Attribute Table is changed. The use of an Attribute Group Table increases the efficiency of delivering content to users.

Figure 4:
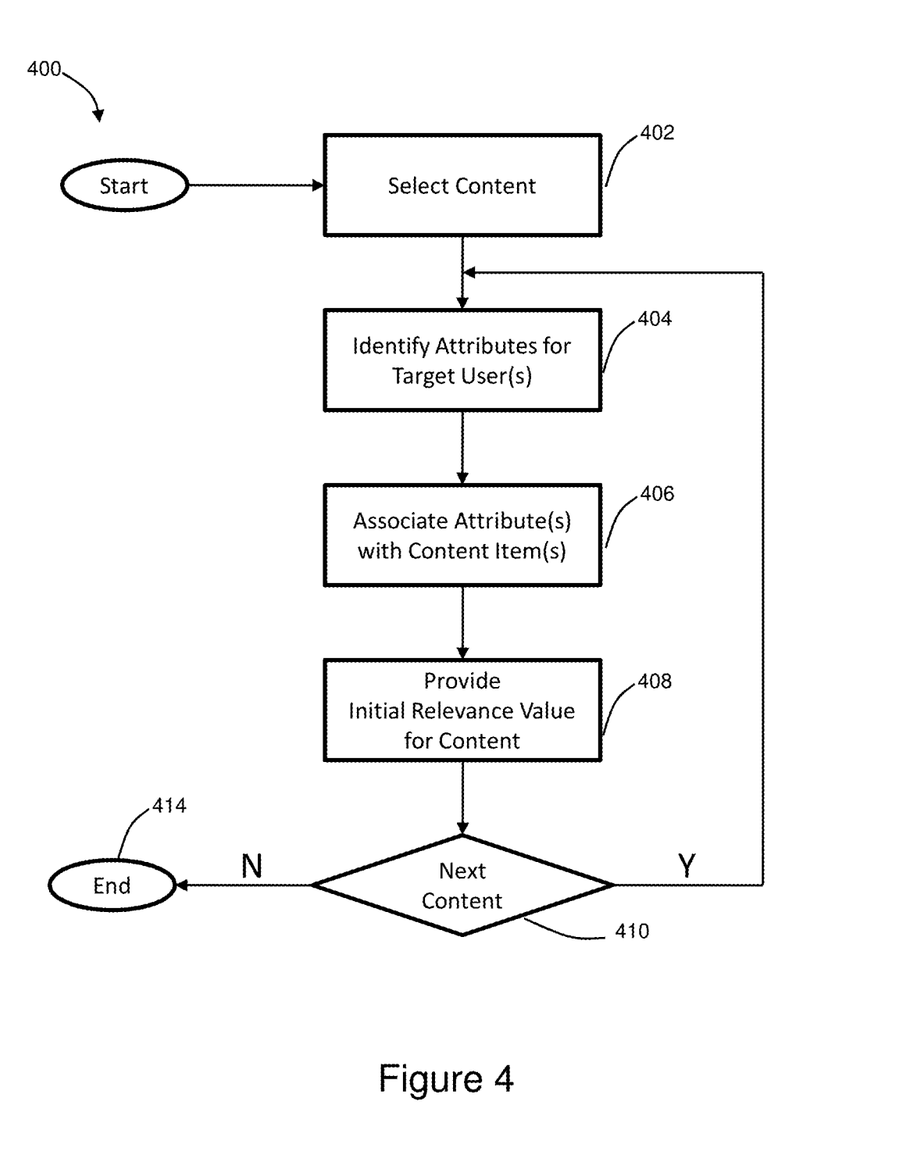
FIG. 4 shows an illustrative flow chart for associating content with a user attribute.

Referring now to FIG. 4, an illustrative flow chart for associating content with one or more user attributes is shown. The method begins at block 402, in which the content administrator chooses a content item. A content item may be any information or product promotion which the merchant wishes to share with a user. For example, content may include a product location, product details, event information, or a coupon. A content item may also be a link to one or more content items, such as a restaurant menu that links to a list of menu items. In some embodiments, a content item may be an application, such as a purchasing or gaming interface.

The method proceeds to block 404, in which the content administrator identifies group attributes to associate with a content item. For example, if a content item "Casino Floor" was selected at block 402, the content administrator may wish to associate user attributes indicating an interest in gaming activities with the content item. The content item "Casino Floor" may be a link leading to a list of casino floor activities, such as a "21 Tournament". The content administrator may wish to associate user attributes indicating an interest in the game blackjack with the content item "21 Tournament." At block 406, the content administrator associates the selected user attributes with the selected content item.

In some embodiments, the merchant is prevented from accessing some or all of the information stored in the user profile. User privacy may be protected by restricting merchant access to sensitive user information. For example, the merchant may be able to determine how many users fall within a particular age range without being able to access the user attribute indicating user age for a particular user.

At block 408, the content administrator provides an initial relevance value for the content item. The initial relevance value is a numerical value, such as a value on a scale of 1-100, indicating the applicability of the selected content item for the selected group attribute as perceived by the content administrator. For example, for the content item "21 Tournament," the content administrator may assign a higher initial relevance value for the user attribute value blackjack than the content administrator would assign for the user attribute value poker, since a user who has indicated an interest in blackjack may be more likely to be interested in a 21 Tournament than a user who has indicated an interest in poker.

At decision diamond 410, the content administrator may proceed to the next content item if the content administrator wishes to associate a next content item with a next user attribute value. If the content administrator has made all assignments, the method ends.

In some embodiments, the content administrator may also exclusively associate a group attribute with a content item. For example, if the content administrator intends for the content item Room Service to be hidden from users who are not staying in a room on the premises, the content administrator may exclude such users from receiving the content item. The group attribute corresponding to users not staying on the premises is excluded from association with the content item Room Service.

Figure 5A:
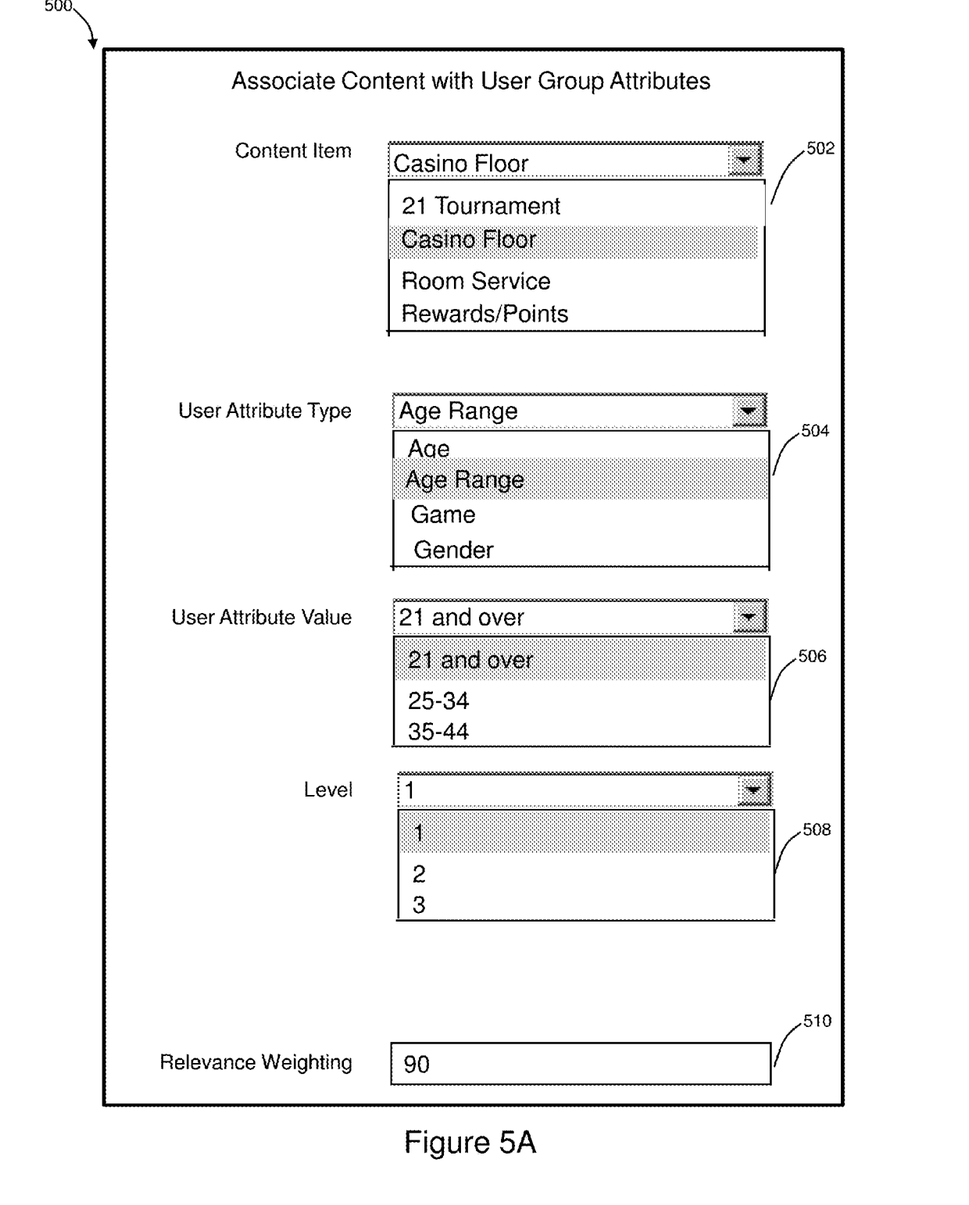
FIGS. 5A-5B show an illustrative content administrator interface for creating content connections.

Referring to FIG. 5A, an illustrative content administrator interface 500 for creating content connections is shown. The content administrator may use the interface shown in FIG. 5A to carry out the method illustrated in FIG. 4. The content administrator selects a content item from a predefined list of content items as shown in the drop down menu 502. The list of content items is comprised of content previously uploaded by the content administrator and stored in the database. In the illustrative example shown in FIG. 5A, the content administrator has chosen the content item "Casino Floor."

The content administrator chooses a group attribute to associate with the content item using drop down menus 504 and 506. At menu 504, the content administrator chooses attribute type "Age Range." In menu 506, the content administrator has selected the attribute value "21 and over" to associate with the selected content item. Only those users who are above the age of 21, as indicated in the user profile stored in the user profile component 114 of system database 112, will receive the content specified in menu 502.

In some embodiments, the merchant may associate content items with merchant generated attributes. Merchant generated attributes are attributes associated with a user that were not specified by the user. For example, a merchant generated attribute may include past user gaming history, such as a history of using slot machines.

The content administrator is provided with a level menu 508. The level indicates whether the content item is a parent item, such as a standalone link or a link to a submenu, or a child item, such as a submenu content item. As shown at 508, the content administrator has specified that content item Casino Floor is a level 1 item. This indicates that the Casino Floor content item is a top level content item which may serve as a parent to a set of lower level content links.

The content administrator may assign an initial relevance value to the content-attribute association created in tables 502-506. The initial relevance value may be a numerical value, such as a number falling in the range of 1-100, with 1 indicating minimum relevance and 100 indicating maximum relevance. As shown in 510, the content administrator has chosen an initial relevance weighting value of 90.

Figure 5B:
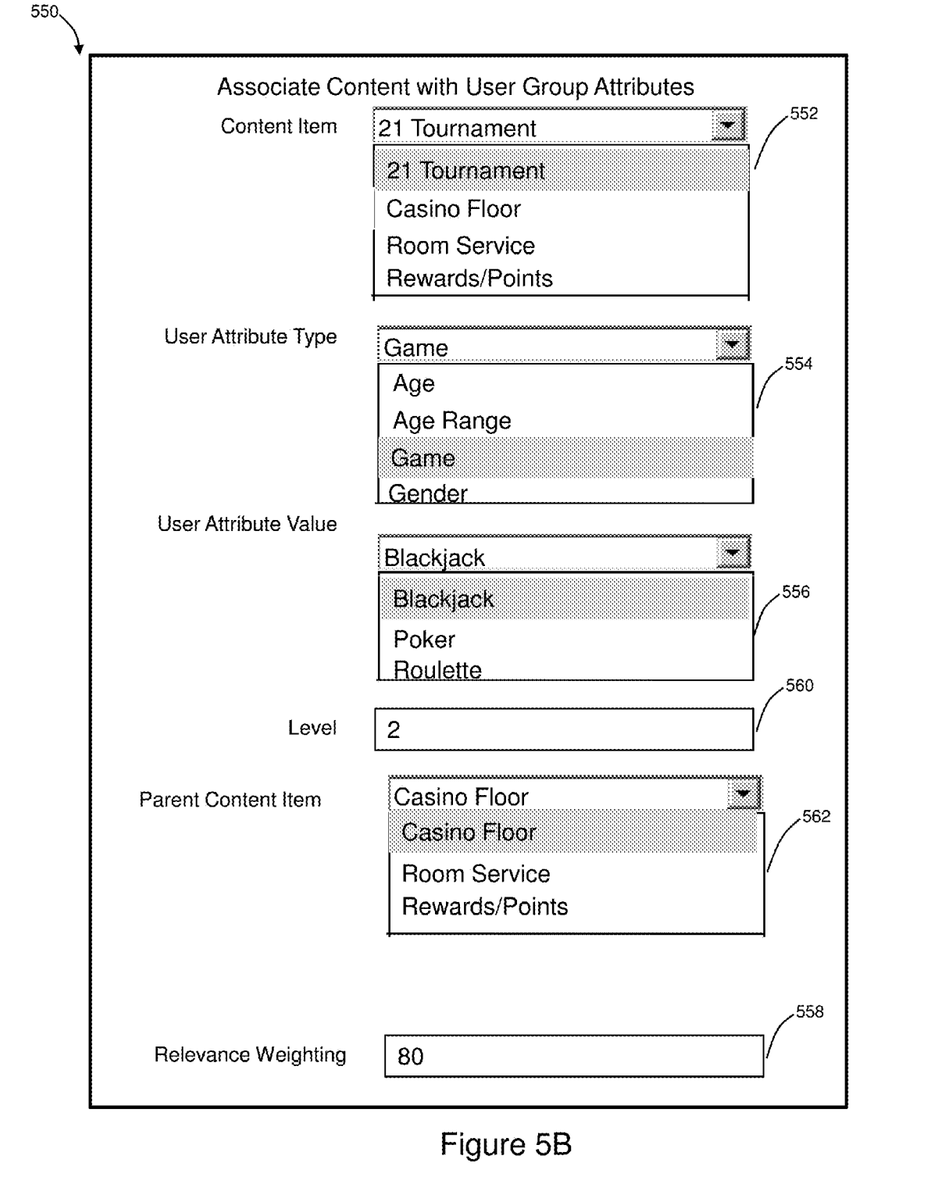

Referring to FIG. 5B, a second illustrative content administrator interface 550 for creating content connections is shown. The content administrator may desire to associate content items comprising a submenu to a top level content item. For example, the content administrator may wish to create a submenu for content item Casino Floor. The submenu may contain, for example, content item "21 Tournament." To create the submenu, the content administrator selects the desired submenu content item from Content Item menu 552. The content item 21 Tournament has been selected from Content Item menu 552. The content administrator then creates content connections to associate one or more user attributes with the content item. For example, in drop down menu 554, the content administrator has chosen the user attribute type Game. The content administrator may wish to associate the content item(s) with an attribute type without specifying an attribute value. For example, the content administrator may choose to associate the selected content item 21 Tournament with all users who have selected user attribute type Game.

Alternatively, the content administrator may wish to associate the selected content items with a group attribute having a particular value. In menu 556, the content administrator has selected the attribute value "Blackjack" to associate with the selected content items. Only those users who have indicated an interest in Blackjack through the user attributes associated with their user profiles will receive the content specified in menu 552.

To indicate that the content item selected, 21 Tournament, is linked to a parent content item, the content administrator sets the level to a value that one greater than the value of the parent level. Thus, since 21 Tournament is an item in a submenu of menu item Casino Floor, 21 Tournament is give a level value of 2, which is one greater than the Casino Floor level value of 1. If the level value is greater than one, a Parent Content Item menu appears as shown at 562. The parent content item menu is populated with all content items having a level value that is one fewer than the level value specified in 560. Thus, since Casino Floor was given a level value of 1, which is one fewer than the level value specified in 560, the content item Casino Floor appears in the Parent Content Item menu. The content administrator chooses the parent content item, for example, Casino Floor, to assign the level 2 content item 21 Tournament to level 1 content item Casino Floor.

If the content administrator wishes to create additional level 2 submenu items under level 1 menu item Casino Floor, the content administrator adds new content item associations, specifying a level value of 2 and a parent item of Casino Floor. The content administrator may also create submenus of submenus by creating a level 3 content item and specifying a level 2 parent content item for the level 3 content item.

As for the parent content items, the content administrator may assign an initial relevance value to the child content item. As shown in 558, the content administrator has chosen an initial relevance weighting value of 80.

In FIG. 5B, the content administrator has selected "21 Tournament" from the submenu items list. A user in the age group 21 and over may receive the content item Casino Floor on the user's wireless handset, as established in the interface shown in FIG. 5A. If the user selects Casino Floor, the user will be shown a submenu comprising the content item "21 Tournament," as established in the interface shown in FIG. 5B.

In some embodiments, the content administrator is able to associate additional filters with the content item user attribute association. The content administrator may wish to serve content to a user based on a time range, date, or user location. For example, the content administrator may associate a content item such as a coupon for coffee with a time range, such as 7:00 AM to 11:00 AM, so that the coupon is delivered to users during this time range. In a second example, the content administrator associates a coupon for coffee with a time range and with a user attribute indicating a user preference for coffee. In the second example, only those users that have specified a preference for coffee receive the coffee coupon content item during the specified time range. Content may be filtered by user location based on information provided by the user's wireless handset to the server regarding the user's location. In some embodiments, the content administrator may associate a content item with a time, date, location, or other filter without associating the content item with a user attribute. In other embodiments, the content administrator may be able to provide content items to all users by indicating no filter is to be applied to such content items.

Figure 6:
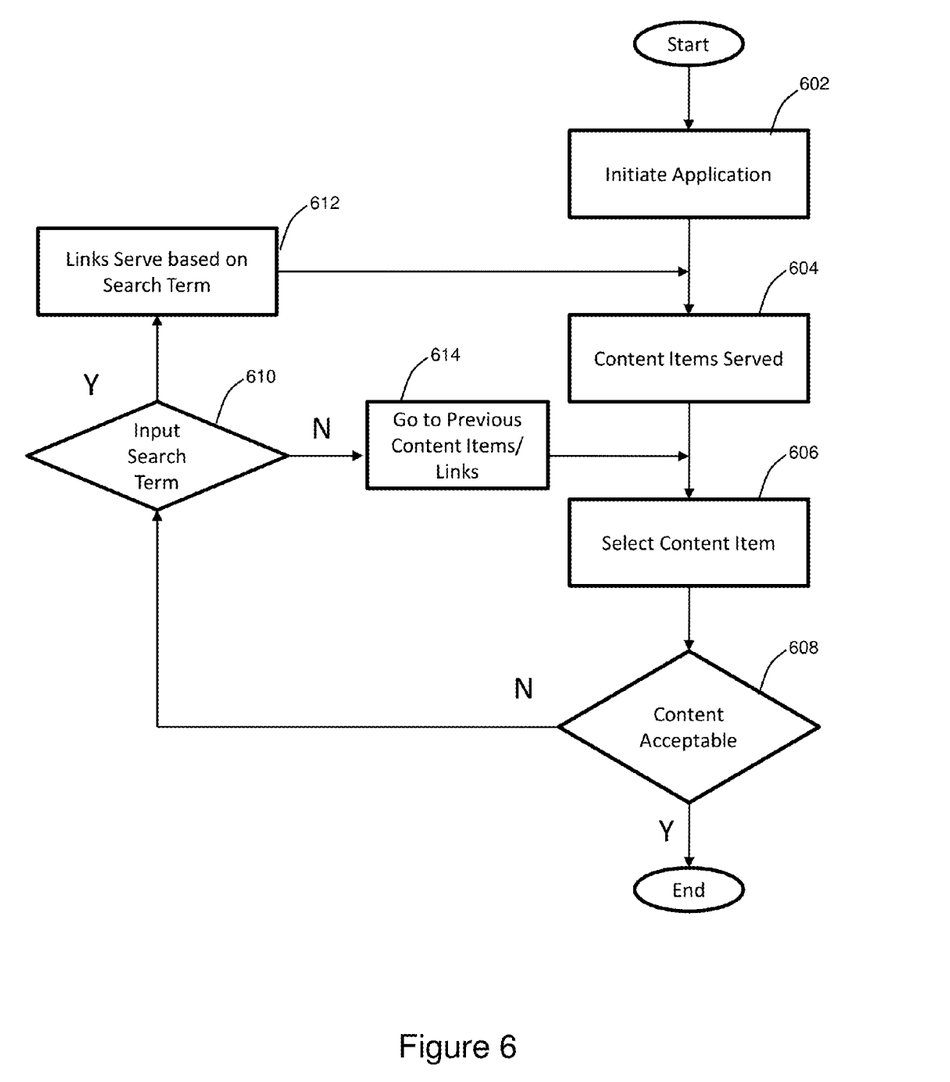
FIG. 6 shows an illustrative flow chart for delivering content to a user.

Referring now to FIG. 6, a flow chart for delivering content to a user is shown. The method typically takes place within the content delivery application 118 running on server 104. The method begins at block 602, in which the user initiates the content interface application 122 on wireless handset 108. At block 604, content items or content links are served to the user based on content associations created by the content administrator as illustrated in FIGS. 4 and 5. At block 606, the user selects the content item. At decision diamond 608, feedback is received from the user regarding whether the content item provided was acceptable. The user may be prompted to provide feedback through the content interface 122. Alternatively, a content rating may be automatically generated based on the selection or non-selection of content delivered to the content interface. The server may update the user profile component 114 of the system database 112 to indicate the selection or non-selection of delivered content, allowing the content delivery application 118 to deliver more targeted results based on user behavior. If the content is acceptable, the method ends. However, if the content delivered is deemed unacceptable to the user, the method proceeds to decision diamond 610. The user may have indicated the unacceptability of the content though negative feedback or a low rating given to the content when the user is prompted for feedback.

At decision diamond 610, the user is prompted to enter a search term. This allows the user to attempt to search the application to find acceptable content. If a search term is input, the method proceeds to box 612, in which content items are served to the user based on the search term input. For example, the content delivery application 118 may filter content from the merchant content component 116 by the search term provided. If matching content is found, the content delivery application delivers content to the content interface 122. If a search term is not input, the method proceeds to box 614, in which the content previously delivered to the wireless handset is re-delivered.

Referring to FIGS. 7A-7D, an illustrative content interface (MADGUI) is shown on a wireless handset. The handset shown is a slide phone having a retractable keypad, however, the wireless handset may have another format, such as a bar-type or flip-type phone or a phone having a touchscreen interface. To get to the MADGUI, the user may have initiated an application as indicated in step 602 of FIG. 6. In response to the initiation of the application, the wireless handset 108 requests information to populate the MADGUI from server 104. The server delivers content to the user based on the content item-user attribute associations and other filters the content administrator has specified. Wireless handset display 700 shows Coffee Shop 702, Shoe Store 704, Spa and Fitness 706, Retailers 708, Restaurants 710, and a 10% Coupon for Coffee 712.

Figure 7A:
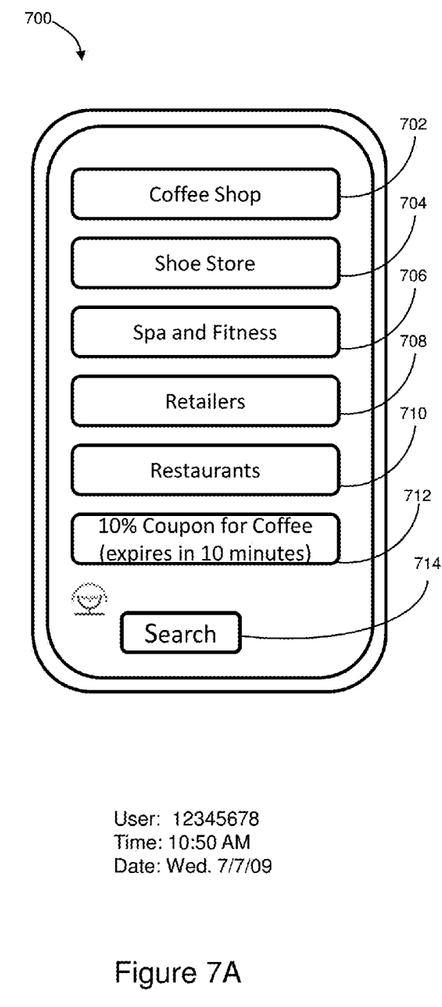
FIGS. 7A-7D show an illustrative content interface on a wireless handset.

The user may have received Coupon 712 based on a preference expressed in a user attribute. Alternatively, the Coupon may have been received based on the time of day that the user is accessing the MADGUI. For example, the content administrator may have specified that a coffee coupon is to be provided between the hours of 7:00 AM and 11:00 AM. Finally, the Coupon may have been received based on a combination of a user attribute and another filter such as a time filter. Similarly, the other MADGUI items may be based on a user attribute-content item association provided by a content administrator, a filtering association, or a combination of user attribute and filter association with a content item.

If the user selects Restaurants 710, the user may be provided with a link to another content item, for example a submenu of restaurants in the vicinity of the user. The submenu of Restaurants may be generated from filtered attributes or other content associations. If the user selects Spa and Fitness 706, the user may receive a submenu of services available from the Spa. The submenu of services may be filtered to include only those services the user has engaged previously. The submenu may include a coupon for a particular service or a service engaged previously.

Figure 7B:
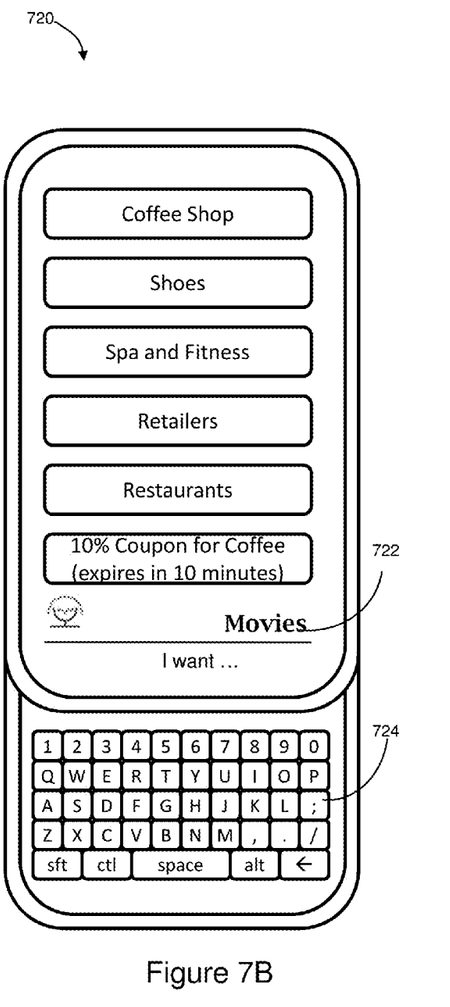

Referring to FIG. 7B, an illustrative MADGUI prompting a user to input a search item is shown. If none of the content items delivered in the MADGUI are acceptable, the user may choose to input a search item. The user may be prompted to or choose to input a search item, for example, by being shown or hitting a search button such as the button shown at 714. In FIG. 7B, the user has entered the search term "Movies" at 722. The user may use keypad 724 to enter the search term. Other wireless handsets may allow search term entry using the handset's numeric keypad, touchscreen keypad, or other input device. The content delivery application 118 will perform a search of merchant content items applicable to the search term and deliver content to the content interface 122 based on the results of the search.

Figure 7C:
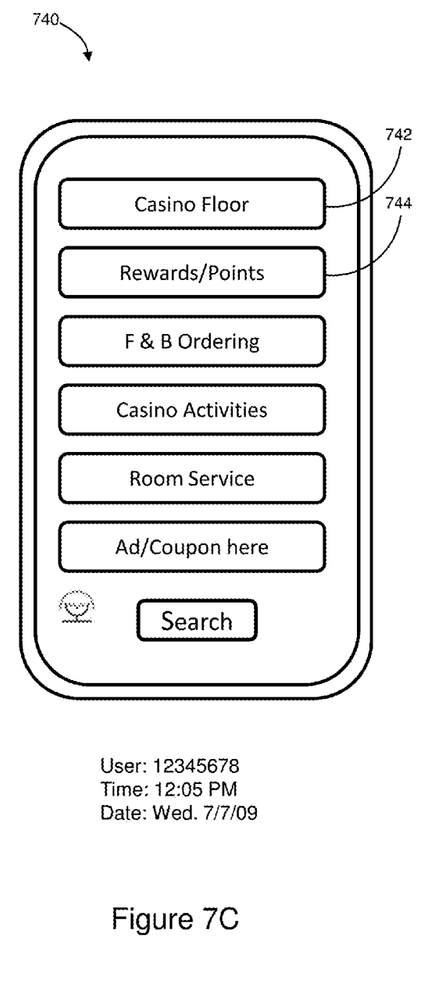

In FIG. 7C, an illustrative MADGUI presented to a user later in the day is shown. The content administrator has specified that content items such as Casino Floor 742 and Casino Activities 744 should be shown to the user, for example, between noon and midnight.

Figure 7D:
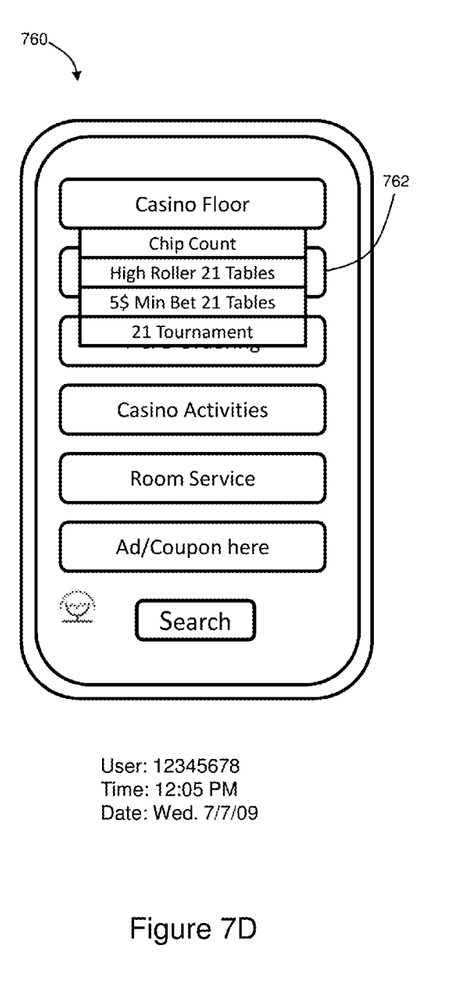

In FIG. 7D, an illustrative MADGUI with submenu deployed is shown. As a result of the user selecting item 742, "Casino Floor," a submenu 762 has been deployed. Because the user 12345678 has an age exceeding 21, content item Casino Floor may be delivered to the user's wireless handset due to the content connection established as shown in FIG. 5A. If the user has indicated an interest in blackjack, the user may also receive the content item 21 Tournament due to the content connection established as shown in FIG. 5B. Whether the user will receive the content item may depend on factors such as the relevance weighting for the content item relative to other content items which match the user's attributes. As FIG. 7D indicates, the user has received the content item Casino Floor. The level 1 content item Casino Floor was established as the parent of level 2 content item "21 Tournament" as shown in FIG. 2. 21 Tournament appears as a content item in submenu 762 after the parent content item Casino Floor is selected.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A content management system, comprising:
    a database including,
        a plurality of user profiles, each user profile comprising one or more user attributes,
        at least one group attribute that is shared by two or more user profiles among the plurality of user profiles,
        a plurality of content items to be delivered to one or more wireless devices,
        a plurality of content connections, each content connection associating a particular group attribute with a particular content item;
    a terminal that provides a content administrator interface to the database, the content administrator interface allowing creation and editing of content items and allowing the content administrator to create a content connection by associating a group attribute with a content item; and
    a content delivery module that filters the plurality of content items based on the group attribute, the content delivery module delivering one or more filtered content items over a wireless network to a wireless device of a user matching the group attribute;
    wherein the one or more filtered content items are displayed on a content interface of the wireless device.

2. The content management system of claim 1, wherein at least one content connection associates at least one time range with a content item and the content item delivered to the wireless device is delivered within the time range connected to the content item.

3. The content management system of claim 1, further comprising a content association module allowing the content administrator to assign a parent display level to a first content item among the plurality of content items and assign a child display level to a second content item among the plurality of content items, wherein the second content item is displayed on the content interface as a submenu item of the first content item.

4. The content management system of claim 1, wherein the particular content item among the plurality of content items is an application.

5. The content management system of claim 1, wherein the database stores an initial relevance value for the content item associated with the group attribute, the initial relevance value indicating applicability of the content item to the group attribute.

6. The content management system of claim 5, wherein the database receives a content rating based on a user response to the one or more filtered content items delivered to the wireless device.

7. The content management system of claim 6, wherein the database updates the relevance value of the one or more filtered content items based on the content rating.

8. The content management system of claim 5, wherein the database updates the relevance value of the one or more filtered content items based on whether a content item delivered to the wireless device is selected.

9. A content management system, comprising:
a database including,
    a plurality of user profiles, each user profile comprising one or more user attributes,
    at least one group attribute that is shared by two or more user profiles among the plurality of user profiles,
    a plurality of content items,
    a plurality of content connections, each content connection associating a particular group attribute with a particular content item;
a content association module that generates an association between a particular group attribute and a particular content item;
a terminal that provides a content administrator interface to the database, the content administrator interface allowing creation and editing of content; and
a content delivery module that filters the plurality of content items based on the group attribute, the content delivery module delivering one or more filtered content items over a wireless network to a wireless device of a user matching the group attribute;
wherein the filtered content items are displayed on a content interface of the wireless device.

10. The content management system of claim 9, wherein at least one content connection associates at least one time range with a content item and the content item delivered to the wireless device is delivered within the time range connected to the content item.

11. The content management system of claim 9, wherein the content association module allows the content administrator to assign a parent display level to a first content item among the plurality of content items and assign a child display level to a second content item among the plurality of content items, wherein the second content item is displayed on the content interface as a submenu of the first content item.

12. The content management system of claim 9, wherein a content item among the plurality of content items is an application.

13. The content management system of claim 9, wherein the database stores an initial relevance value for the content item associated with the group attribute, the initial relevance value indicating applicability of the content item to the group attribute.

14. The content management system of claim 13, wherein the database receives a content rating based on a user response to the one or more filtered content items delivered to the wireless device.

15. The content management system of claim 14, wherein the database updates the relevance value of the one or more filtered content items based on the content rating.

16. The content management system of claim 13, wherein the database updates the relevance value of the one or more filtered content items based on whether a content item delivered to the wireless device is selected.

17. A method for delivering content to a wireless device, comprising:
receiving a user profile from the wireless device and storing the user profile on a database, the user profile comprising a plurality of user attributes;
storing at least one group attribute that is shared by two or more user profiles among a plurality of user profiles;
transmitting a plurality of content items from a terminal to the database;
storing a plurality of content connections on the database, each content connection associating a particular group attribute with a particular content item;
filtering the plurality of content items based on a group attribute; and
transmitting filtered content items over a wireless network to the wireless device of a user matching the group attribute;
wherein the filtered content items are displayed on a content interface of the wireless device.

18. The method of claim 17, further comprising:
storing on the database at least one content connection associating at least one time range with a content item; and
filtering the plurality of content items by the at least one time range.

19. The method of claim 17, wherein the database further stores an initial relevance value for the content item associated with the group attribute, the initial relevance value indicating applicability of the content item to the group attribute.

20. The method of claim 19, wherein the database further stores a content rating based on a user response to the filtered content items delivered to the wireless device.

21. The method of claim 20, further comprising updating the relevance value of the filtered content items based on the content rating.

22. The method of claim 19, further comprising updating the relevance value of the filtered content items based on whether a content item delivered to the wireless device is selected on the content interface.

* * * * *